United States Patent [19]
Mok et al.

[11] Patent Number: 5,448,550
[45] Date of Patent: Sep. 5, 1995

[54] SELECTING SECTORS IN A STORAGE MEDIUM

[76] Inventors: Fai Mok, 4636 Talisman St., Torrance, Calif. 90503; Jeff Yu, 19655 Singing Hills Dr., Northridge, Calif. 91326

[21] Appl. No.: 79,084

[22] Filed: Jun. 16, 1993

[51] Int. Cl.⁶ .................................. G11B 7/00
[52] U.S. Cl. .................... 369/272; 369/58; 369/52; 369/282
[58] Field of Search .............. 369/275.1, 275.3, 275.4, 369/272, 273, 274, 277, 278, 111, 292, 58, 280, 282, 112, 48, 47, 52; 235/458, 494, 484

[56] References Cited

U.S. PATENT DOCUMENTS

| | | | |
|---|---|---|---|
| 5,058,092 | 10/1991 | Miyaska | 369/58 |
| 5,151,313 | 9/1992 | Takeuchi et al. | 369/52 X |
| 5,258,974 | 11/1993 | Ishimura et al. | 369/275.1 |
| 5,303,225 | 4/1994 | Satoh et al. | 369/275.3 |

*Primary Examiner*—Aristotelis Psitos
*Assistant Examiner*—Thang V. Tran
*Attorney, Agent, or Firm*—Peter P. Tong

[57] ABSTRACT

Selecting different sectors in a storage medium using switches on the storage medium, instead of programming the instrument reading the storage medium. Each switch has a switching material. The switching material can be located at more than one interchangeable position. The position determines the priority of its corresponding sector as compared to other sectors. The location of the switching material is determined electronically. Switching materials suitable for the present invention include a reflective material, an opaque material, a reflective concave material, a convex lens, a prism, a set of lines, a magnetic material and a flexible reflective membrane.

30 Claims, 14 Drawing Sheets

SELECTING SECTORS IN A STORAGE MEDIUM

BACKGROUND OF THE INVENTION

The present invention relates generally to a storage medium and more particularly to apparatus and methods of selecting sectors in a storage medium.

Programming compact disc (CD) players have been a constant nuisance to many. Electronic instruments' makers cram players and remote controls with rows of hard-to-decipher buttons. For decades, they have been racing to add new features that make their gadgets more confusing to operate. In some cases, instruction manuals are thicker than the remote controls they describe. When to use which button for what purpose has been a source of annoyance.

After programming a player for a disc, the problem is far from over. If one turns off the player, one might have to re-program the player. Also, different brands of players usually have different programming formats. To be able to program one brand does not imply to be able to program another brand. Consumers want ease-of-use.

It will be apparent from the foregoing that there is still a need for apparatus and methods of easily selecting different songs in different discs so that different players can automatically play the songs selected.

SUMMARY OF THE INVENTION

With the present invention, different sectors in a storage medium can be selected without programming the instrument reading the storage medium. Storage mediums can be switched without the need for re-programming the instrument, and the instrument can be turned off without losing the selections because the selections are not in the instrument.

The preferred sector in the storage medium is selected with switches on the storage medium. If one wants to select another sector, one just manipulates the switch corresponding to that sector to a select position. Some application for this invention includes playing compact discs and reading stored pictures from the storage medium.

A preferred embodiment of the present invention has a storage medium and more than one switch on the storage medium. The storage medium stores more than one group of data. Each group is in a sector of the storage medium. Each switch identifies and prioritizes a sector in the storage medium.

Each switch has a switching material. The switching material can be located at more than one interchangeable position to determine the priority of the sector corresponding to the switch. The location of the switching material is determined electronically.

Different materials are suitable as switching materials, such as, a reflective material, an opaque material, a reflective concave material, a convex lens, a prism, a set of lines and a magnetic material.

Other aspects and advantages of the present invention will become apparent from the following detailed description, taken in conjunction with the accompanying drawings, illustrating by way of examples the principles of the invention.

DESCRIPTION OF THE PREFERRED EMBODIMENT

The present invention reduces the tediousness of selecting sectors in a storage medium. The selections are set on the storage medium, instead of in the instrument reading the storage medium. Thus, a different instrument can be used without the need for re-programming the instrument. Also, instruments can be turned on and off without affecting the selection because the selection is not in the instrument.

This invention is applicable to play songs in a CD. Different songs in the CD are represented by different switches on the CD. By setting the different switches to different positions, different songs are selected to be played.

The invention is also applicable to view pictures stored electronically in a storage medium like an optical disc. Different switches correspond to different pictures. Pictures desired to be seen are selected through their switches. Those pictures selected can be displayed on a screen. This is similar to an electronic photo album.

Figure 1:
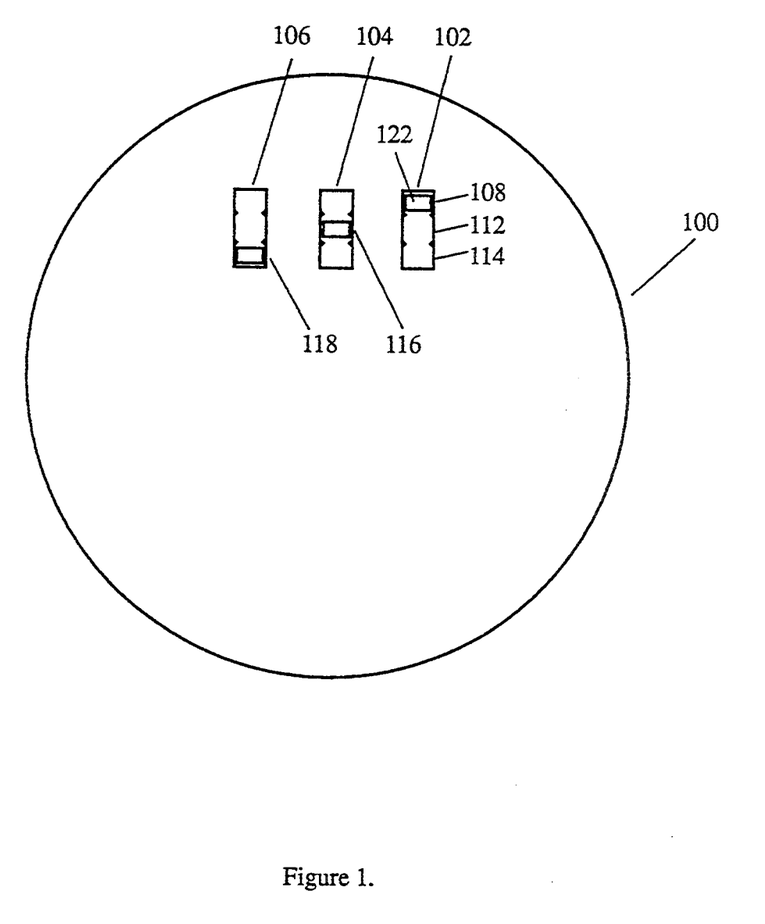
FIG. 1 shows a preferred embodiment of the present invention.

FIG. 1 shows a preferred embodiment of the present invention with a storage medium 100 that stores more than one group of data. Each group can be a song, a lecture or other self-contained unit. The groups are prioritized. If each group is a song, then a high priority song is played before a low priority song.

On the storage medium 100, there are more than one switch, such as 102, 104 and 106. Each switch identifies a sector in the medium 100. Each switch has a switching material that can be positioned at more than one location. The different locations of a switch indicate the priority of its corresponding sector as compared to other sectors. For example, the switch 102 has a switching material 122, which can be at any one of the three positions 108, 112 and 114. In the present example, the switching material 122 is at the first position 108. The switching material for the switch 104 is at its second position 116, and the switching material for the switch 106 is at its third position 118. In terms of priority, the switch 102 has a higher priority than the switch 104, which in turn has a higher priority than the switch 106.

Figure 2A:
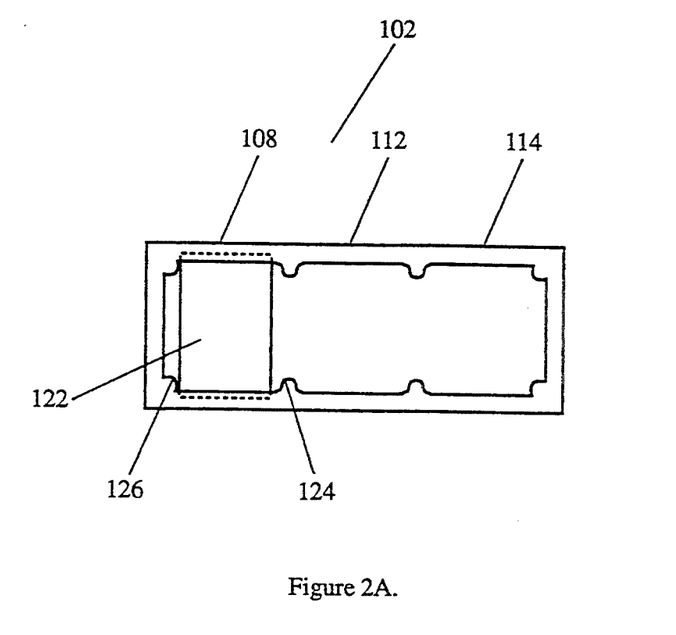
FIGS. 2A and 2B show different perspectives of a switch with a switching material in a preferred embodiment of the invention.
Figure 2B:
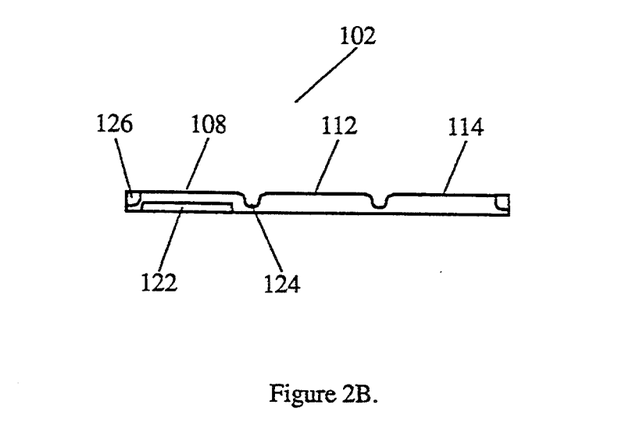

For each switch, different holding mechanism can be used to position the switching material. FIGS. 2A-B show one holding mechanism. FIG. 2A shows the top view of the switch 102 with indentations 124 and 126. FIG. 2B shows the side view of the switch. The indentations 124 and 126 define the location of the switching material 122. The switching material 122 can be moved from the position 108 to the position 112 by a directional object such as a pencil. The size of the switch 102 should not be too small for a directional object to move the switching material. In this example, the switching material is moved mechanically. In another example to be described, the different positions of the switching material 122 are set electronically. For clarity of presentation, the holding mechanisms for the switching materials in the following examples are not shown in the figures.

Figure 3A:
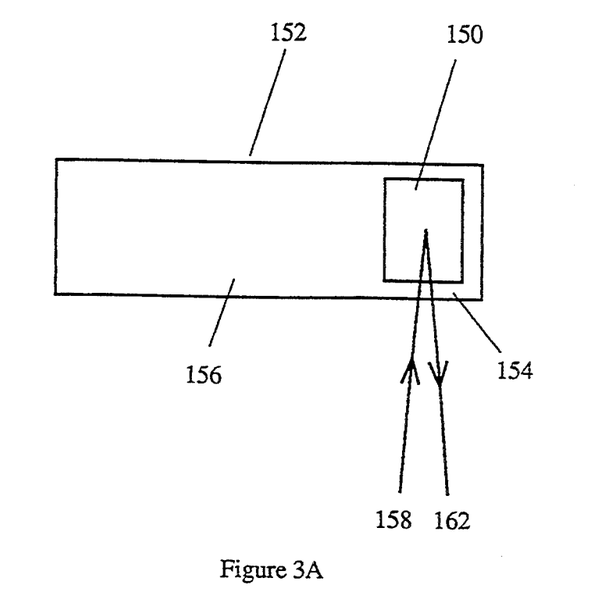
FIGS. 3A and 3B show a switch with a reflective material as a switching material in a preferred embodiment of the invention.

Different materials are used as switching materials. FIG. 3A shows a switch with a reflective material as the switching material. The switch 152 is preferably located on a non-reflective surface of the storage medium. The reflective material 150 can be positioned at different locations, such as 154, 156, to determine the priority of its corresponding sector in the storage medium.

Figure 3B:
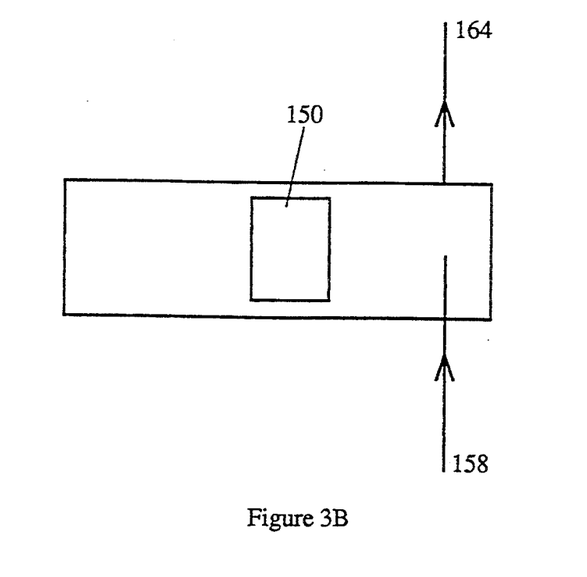

The location 154 of the reflective material 150 is automatically determined by the interaction of the reflective material 150 with an incident electromagnetic radiation 158. By scanning the incident radiation 158 across the different locations and measuring its reflection 162, the location of the reflective material 150 is determined. Another way to measure the location of the reflective material 150 is by scanning the incident radiation and measuring its transmitted radiation 164, as shown in FIG. 3B.

Different electronic methods can be used to generate the electromagnetic radiation, to scan it across the storage medium and to detect it. These methods are obvious to these with ordinary skill in the art of electronics. They will not be further described in the present specification. A general description of such methods can be found in "Video Disk and Optical Memory Systems," written by Jordan Isailovic and published by Prentice-Hall. The above reference is incorporated by reference into the specification.

Figure 4A:
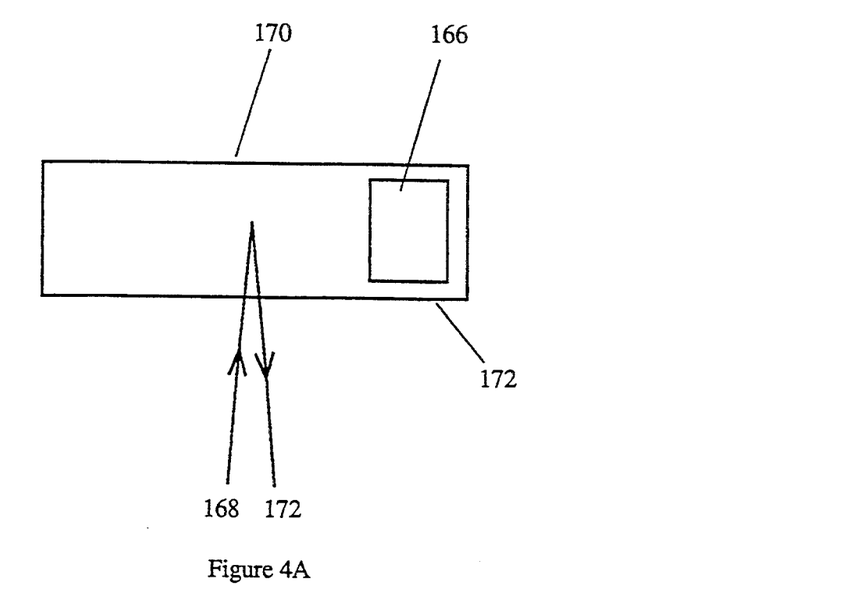
FIGS. 4A and 4B illustrate a switch with an opaque material as a switching material in a preferred embodiment of the invention.
Figure 4B:
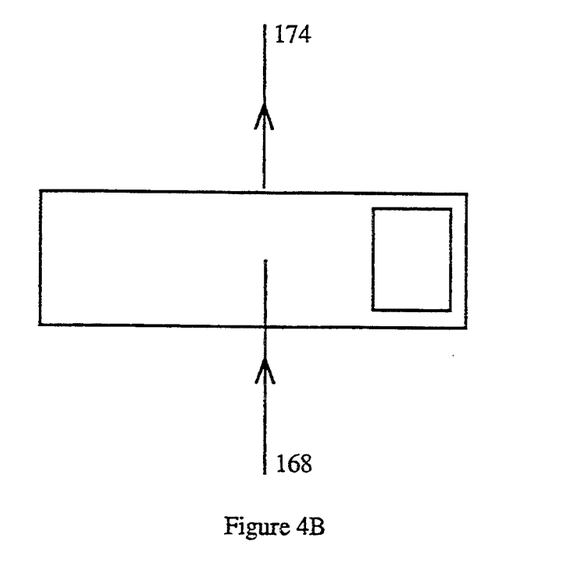

FIGS. 4A and 4B illustrate a switch 170 with an opaque material 166 as the switching material. The switch is preferably located either on a reflective surface or a transparent portion of the storage medium. In FIG. 4A, the switch 170 is located on a reflective surface. The location 172 of the opaque material 166 is automatically determined by the interaction of the opaque material 166 with an incident electromagnetic radiation 168. By scanning the radiation 168 and measuring its reflection 172 in positions without the opaque material 166, the position of the opaque material 166 is indirectly determined.

In FIG. 4B, the switch 170 is located on a transparent portion of the storage medium. By scanning the radiation 168 and measuring its transmitted radiation 174, the position of the opaque material 166 is again indirectly determined.

Figure 5:
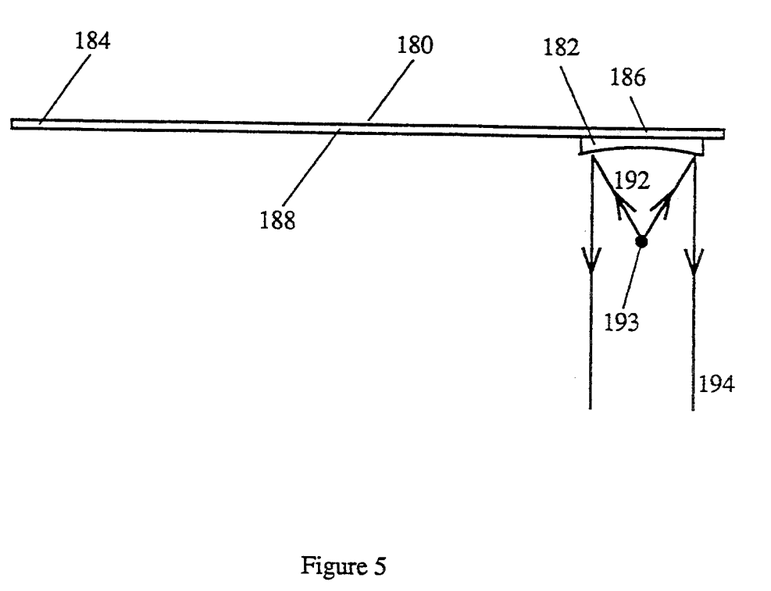
FIG. 5 depicts the side view of a switch with a reflective concave material as a switching material in a preferred embodiment of the invention.

FIG. 5 shows the side view of a switch 180 with a reflective concave material 182 as the switching material. The switch 180 is preferably located on a non-reflective surface of the storage medium. The reflective concave material 182 is positioned at different locations 186, 188 to determine the priority of its corresponding sector in the storage medium.

The location 186 of the reflective concave material 182 is automatically determined by the interaction of the reflective concave material 182 with an incident electromagnetic radiation 192 from a source 193. With the source 193 approximately at the focal point of the concave material, the reflected radiation 194 is substantially collimated. By manipulating the source 193 to scan the incident radiation 192 and by measuring the reflected collimated radiation, the position of the reflective concave material 182 is determined.

Figure 6A:
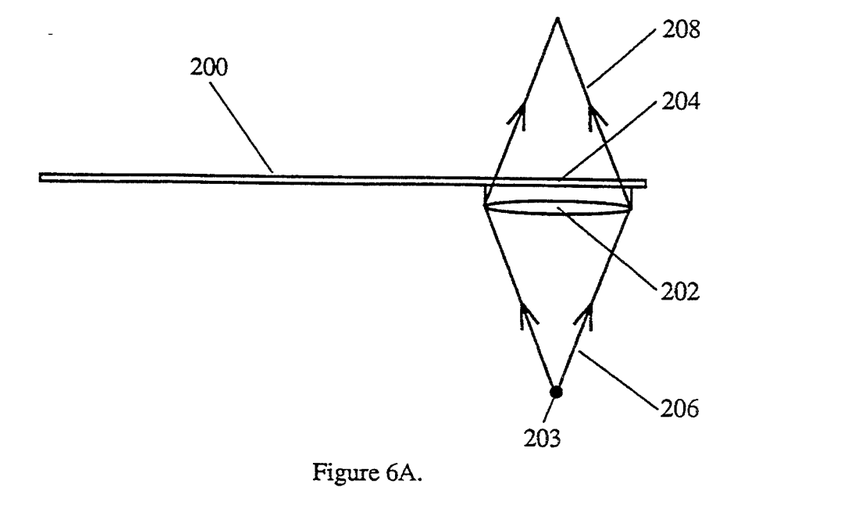
FIGS. 6A and 6B show a switch with a convex lens as a switching material in a preferred embodiment of the invention.
Figure 6B:
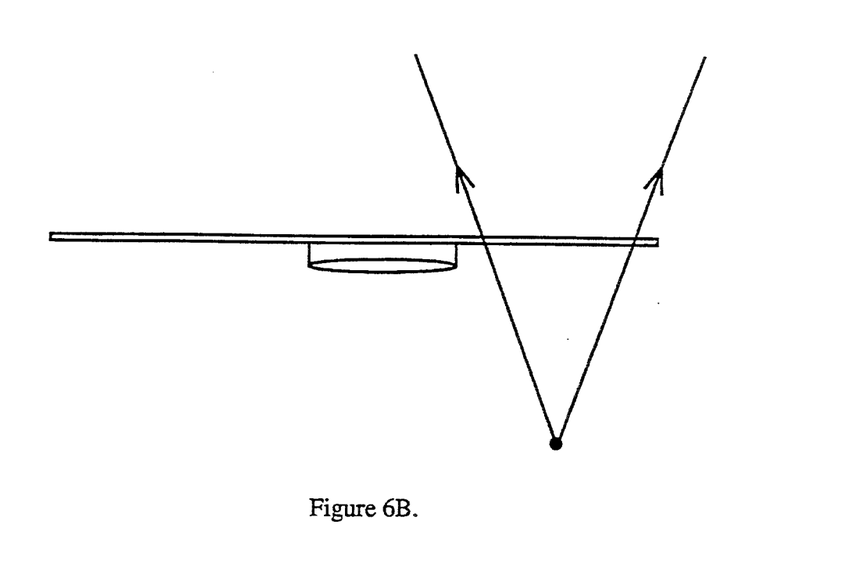

FIGS. 6A and 6B show a switch 200 with a convex lens 202 as the switching material. The switch 200 is preferably located on a transparent portion of the storage medium. The location 204 of the convex lens 202 is automatically determined by the interaction of the convex lens 202 with an incident electromagnetic radiation 206 from a source 203. By manipulating the source 203 to scan the incident radiation 206 and by measuring the transmitted radiation 208, the position of the lens 202 is determined. As shown in FIG. 6A, if the lens 202 is at position 204, then the transmitted radiation 208 is approximately focused to a point; if the lens 202 is not at position 204, as shown in FIG. 6B, the transmitted radiation will not be focused.

Figure 7:
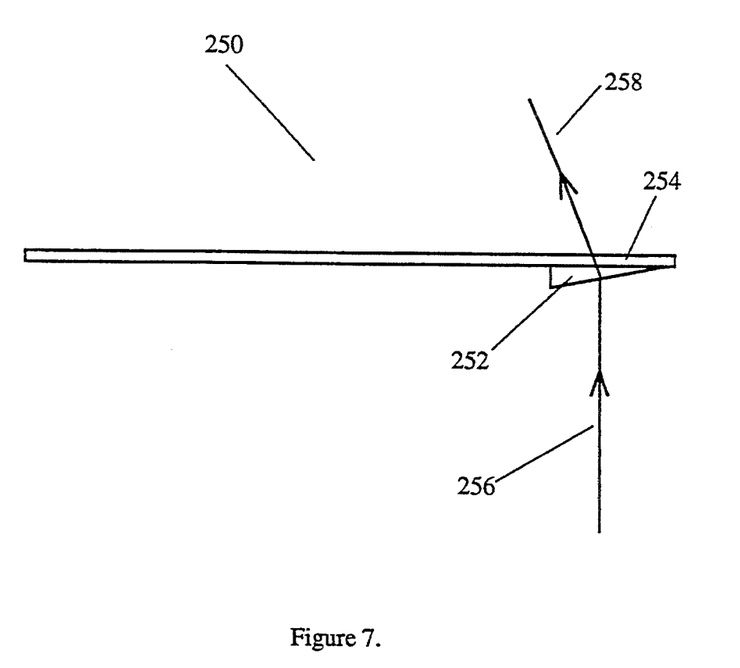
FIG. 7 illustrates a switch with a prism as a switching material in a preferred embodiment of the invention.

FIG. 7 illustrates a switch 250 with a prism 252 as the switching material. The switch 250 is preferably located on a transparent portion of the storage medium. The location 254 of the prism is automatically determined by the interaction of the prism 252 with an incident electromagnetic radiation 256. If the prism is at position 254, then the transmitted radiation 258 is refracted. If the prism is not at position 254, then the transmitted radiation 258 is along the same radiation path as the incident radiation 256. By scanning the incident radiation 256 and measuring the position of its transmitted radiation 258, the position of the prism 252 is determined.

Figure 8:
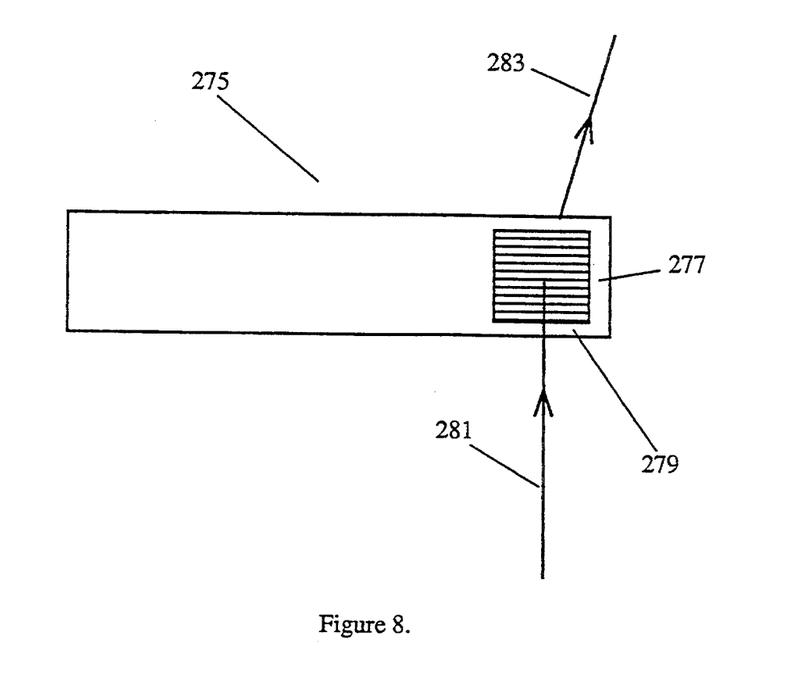
FIG. 8 shows a switch with a set of lines as a switching material in a preferred embodiment of the invention.

FIG. 8 shows a switch 275 with a set of lines 277 of substantially equal line spacing as the switching material. The switch 275 is preferably located on a transparent portion of the storage medium. The location 279 of the lines is automatically determined by the interaction of the lines 277 with an incident electromagnetic radiation 281. The lines serve as a diffraction grating. Diffraction gratings are well known to those with ordinary skill in the art of electronics, and will not be further described in the specification. If the lines are at position 279, then the transmitted radiation 283 is along the same radiation path as the incident radiation 281. By scanning the incident radiation 281 and measuring the position of its transmitted radiation 283, the position of the lines 277 is determined.

Figure 9A:
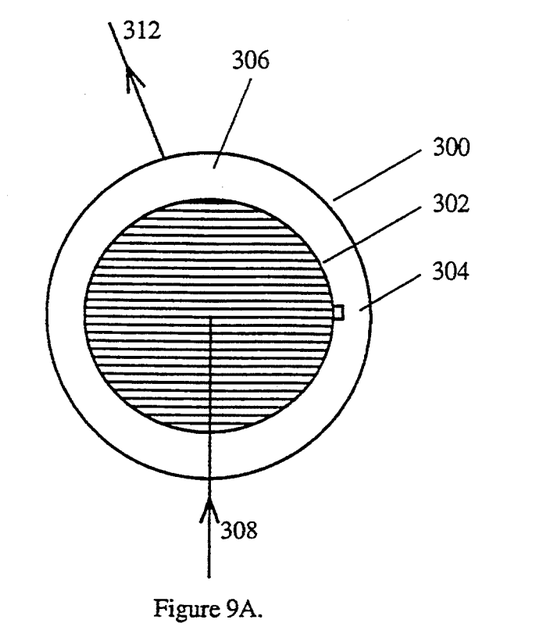
FIGS. 9A and 9B illustrate a circular switch with a set of lines as a switching material in a preferred embodiment of the invention.
Figure 9B:
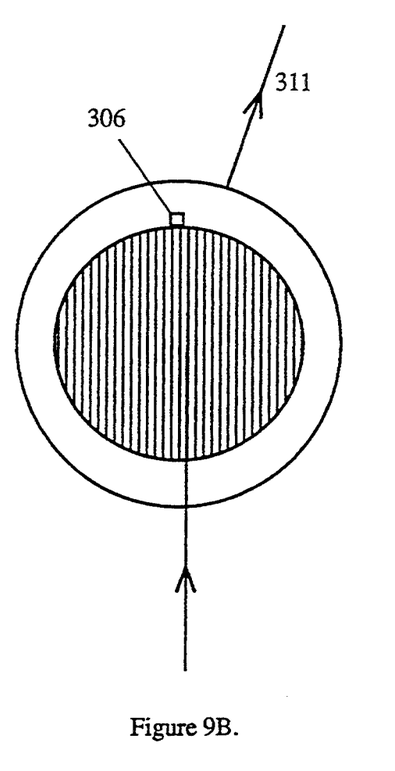

FIGS. 9A and 9B illustrate a circular switch 300 with a set of lines 302 of substantially equal line spacing as the switching material. The switch 300 is preferably located on a transparent portion of the storage medium. The lines can be rotated to more than one location 304, 306 to determine the priority of their corresponding sector. The orientation of the plurality of lines 302 is automatically determined by the interaction of the lines with an incident electromagnetic radiation 308. If the lines 302 are at location 304, as in FIG. 9A, the transmitted radiation 312 is diffracted to a specific direction. If the lines is at location 306, as in FIG. 9B, the transmitted radiation 311 is diffracted to a different direction. By rotating the lines 302, the transmitted radiation traces out a circular path. From the position of the transmitted radiation, the orientation of the lines 302 is determined.

Figure 10:
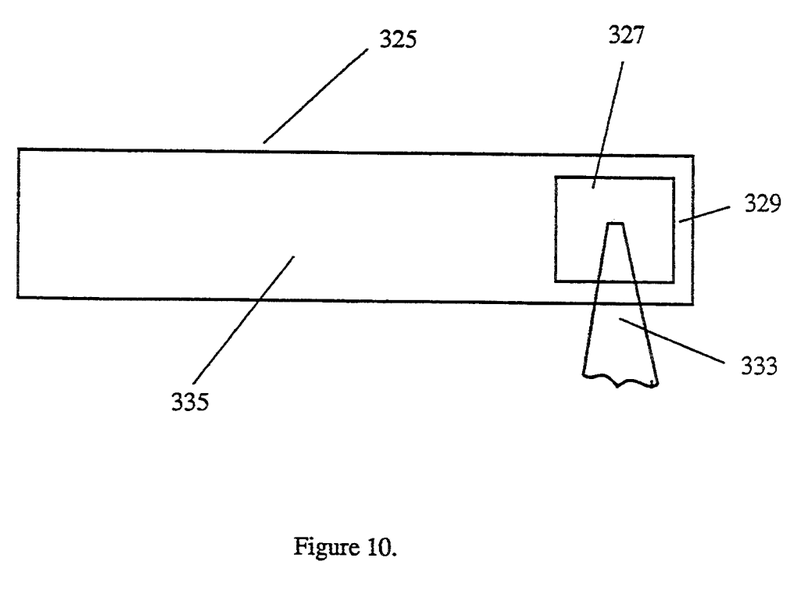
FIG. 10 shows a switch with a magnetic material as a switching material in a preferred embodiment of the invention.

FIG. 10 shows a switch 325 with a magnetic material 327 as a switching material. The location 329 of the magnetic material 327 is automatically determined by the interaction of the magnetic material 327 with a magnetic head 333. The magnetic head 333 can be made of a loop of wire with a current flowing through the loop. The magnetic material 327 changes the magnetic flux through the loop which in turn changes the magnitude of the current. By measuring magnitude of the current at different positions 329, 335, the position of the magnetic material 329 is determined.

Figure 11A:
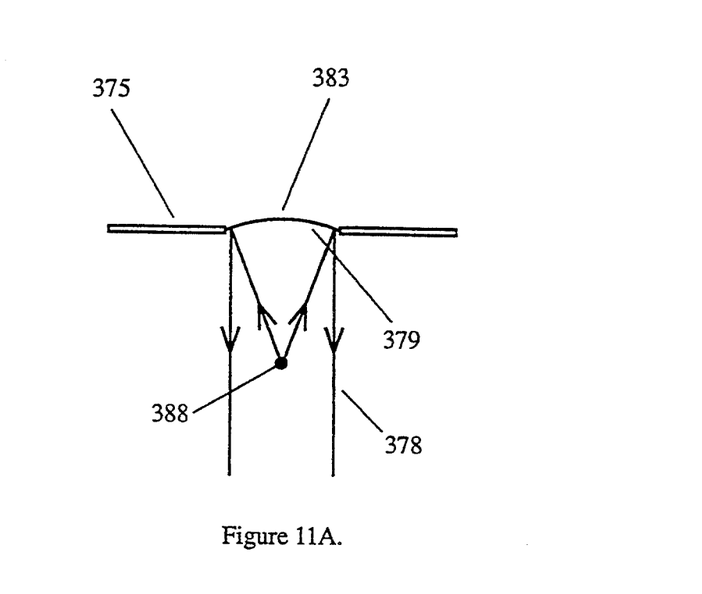
FIGS. 11A and 11B show a switch in a preferred embodiment of the invention with two interchangeable positions.
Figure 11B:
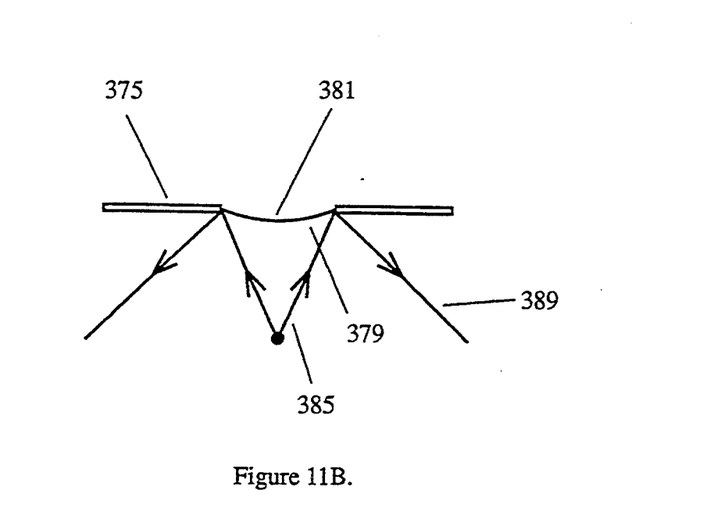

FIGS. 11A and 11B show the side view of a switch 375 with only two interchangeable positions, one position indicating the corresponding sector being selected, the other indicating the corresponding sector not being selected. The switch 375 has a flexible reflective membrane 379 with a concave state 383, as shown in FIG. 11A, and a convex state 381, as shown in FIG. 11B. The two states are interchangeable.

The state is automatically determined by the interaction of the flexible reflective membrane 379 with an incident electromagnetic radiation 385. FIG. 11A shows that with the switch 375 in the concave state 383 and the source 388 of the radiation approximately positioned at the focal point of the reflective surface 379, the reflected radiation 387 is substantially collimated. FIG. 11B shows the switch 375 in the convex state 381 with the reflected radiation 389 diverging. Thus by measuring the reflected radiation, the state of the switch 375 is determined.

Figure 12:
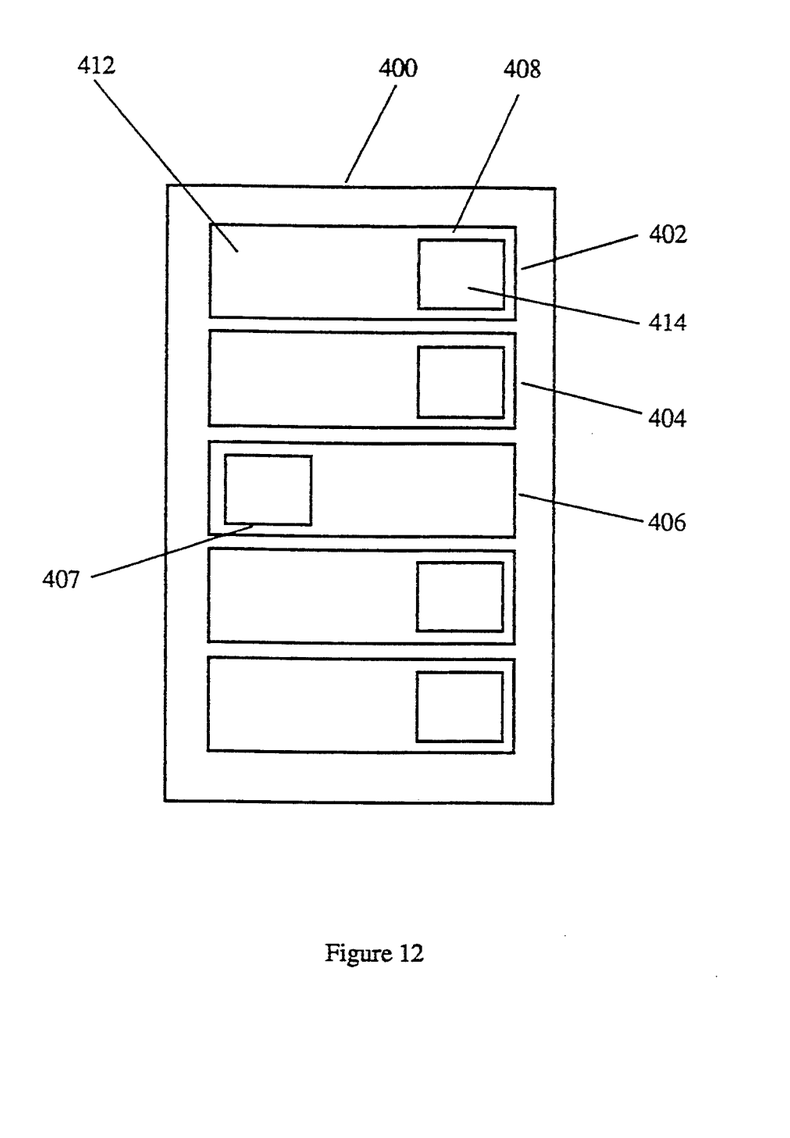
FIG. 12 shows a switch with more than one sub-switch in a preferred embodiment of the invention.

FIG. 12 shows a plurality of sub-switches, 402, 404, 406, each being one of the above preferred switches. The plurality of sub-switches generates one preferred switch 400. The switching material in each sub-switch can be located in at least two interchangeable positions, one position being a select position and the other being a un-select position. For example, the switching material 414 in the sub-switch 402 can be located in either the position 408 or the position 412. One position indicates that the corresponding sector is selected, and the other indicates that the corresponding sector is not selected. Of all the five sub-switches, only the switching material in the sub-switch 406 is located in the select position 407. This indicates that the sector corresponding to switch 400 has the third priority as compared to other sectors.

Figure 13:
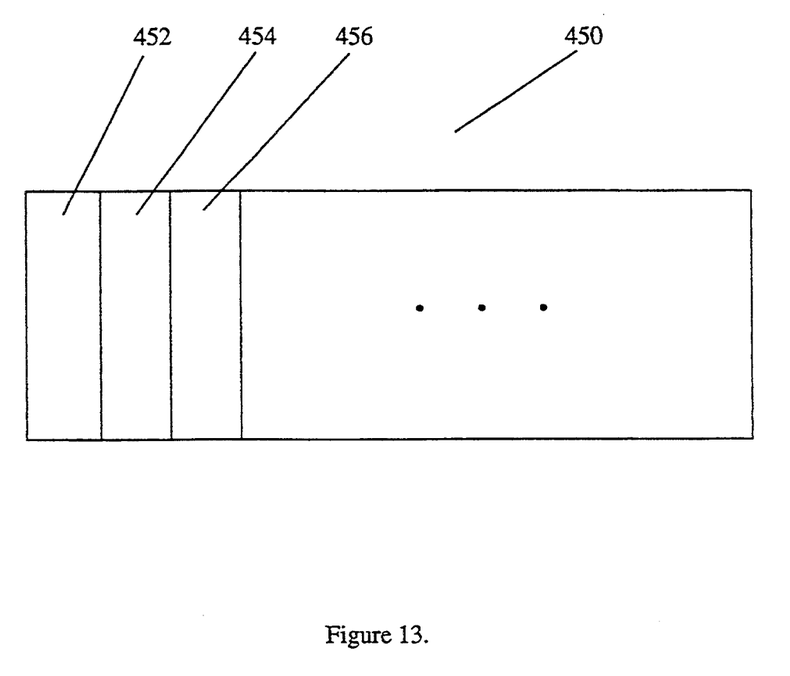
FIG. 13 shows a plurality of switches in a preferred embodiment of the invention with their states electronically set.

FIG. 13 shows a plurality of switching materials, such as 452, 454 and 456, each being a section on a magnetic tape 450. Each switching material is set either to a positive or to a negative polarity by a magnetic head. Since the setting process is well known to those with ordinary skill in the art of electronics, it will not be further described in the specification. Either the positive or the negative polarity can be the select position of the switching materials.

One way to use switches shown in FIG. 13 is in viewing pictures stored in a storage medium. Each picture is stored as an electronic image by a group of data in a sector of the storage medium. Each section on the magnetic tape 450 corresponds to one picture. The pictures are sequentially retrieved on a screen. Those pictures that are desired for later viewing will be selected. This is done sequentially for every picture in the storage medium. For example, the picture corresponding to the section 452 is viewed on the screen, and then the picture corresponding to the section 454 is viewed on the screen. After finishing the entire selection process for all the pictures, only the selected pictures are displayed on the screen upon request. This is similar to an electronic photo album where only desired pictures are shown.

Figure 14:
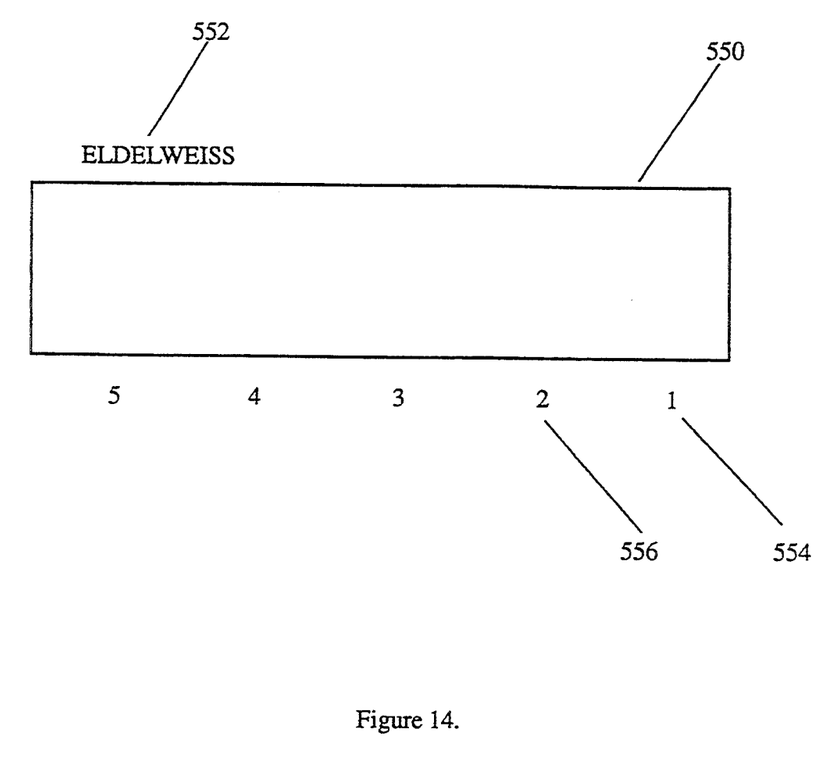
FIG. 14 depicts a label and symbols on a switch in a preferred embodiment of the invention.

FIG. 14 depicts a switch 550 with a label 552 and symbols 554 and 556. The label 552 is adjacent to the switch 550 and is used to name the sector in the storage medium corresponding to the switch. For example, if the corresponding sector is a song called Edelweiss, this name "Edelweiss" is placed next to the switch 552. The symbols 554 and 556 denote the priority of the switch as compared to other switches. For example, if the switching material is located adjacent to symbol 554, then the sector corresponding to the switch 550 is at the first priority. This implies that the song Edelweiss is played before other songs in the storage medium.

The present invention is applicable to any storage medium with more than one sector. Instead of setting the priority of each sector in the instrument using the storage medium, the present invention sets the priority on the storage medium. The selection is easily accomplished by electronically or mechanically manipulating switches on the storage medium. With this invention, one can change to a different instrument without the need for re-programming the instrument. One can also turn on and off the instrument without losing the selection.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

We claim:

1. An apparatus comprising:
    a storage medium for storing a plurality of groups of data, each group being stored in a sector of the storage medium, and the groups being prioritized; and
    a plurality of switches located on the storage medium, each switch identifying a sector in the storage medium and each switch having a plurality of interchangeable positions to indicate the priority of its corresponding sector as compared to other sectors;
    wherein,
        an operator can change the positions of the switch; and
        the groups of data are recorded in the storage medium by a method different from a method to implement switching materials to the switches.

2. An apparatus as recited in claim 1 wherein each switch comprises a magnetic material with its positive and negative polarity being the interchangeable positions.

3. An apparatus as recited in claim 1 further comprising:

a plurality of labels, each label being adjacent to each switch to name its corresponding sector in the storage medium; and a plurality of symbols adjacent to each positions of each switch for indicating the priority of its corresponding sector.

4. An apparatus as recited in claim 1 wherein each switch comprises:

a reflective concave material; and means for positioning the reflective concave material at a plurality of locations to determine the priority of its corresponding sector, and the location of the reflective concave material being automatically determined by the interaction of the reflective concave material with an incident electromagnetic radiation.

5. An apparatus as recited in claim 1 wherein each switch comprises:

a concave lens; and means for positioning the lens at a plurality of locations to determine the priority of its corresponding sector, and the location of the lens being automatically determined by the interaction of the concave lens with an incident electromagnetic radiation.

6. An apparatus as recited in claim 1 wherein each switch comprises:

a prism; and means for positioning the prism at a plurality of locations to determine the priority of its corresponding sector, and the location of the prism being automatically determined by the interaction of the prism with an incident electromagnetic radiation.

7. An apparatus as recited in claim 1 wherein each switch comprises:

a plurality of lines with substantially equal line spacing; and means for positioning the plurality of lines at a plurality of locations to determine the priority of their corresponding sector, and the location of the plurality of lines being automatically determined by the interaction of the lines with an incident electromagnetic radiation.

8. An apparatus as recited in claim 1 wherein each switch comprises:

a plurality of lines with substantially equal line spacing; and means for rotating the plurality of lines to a plurality of locations to determine the priority of their corresponding sector, and the rotational location of the plurality of lines being automatically determined by the interaction of the lines with an incident electromagnetic radiation.

9. An apparatus as recited in claim 1 wherein each switch comprises:

a magnetic material; and means for positioning the magnetic material at a plurality of locations to determine the priority of its corresponding sector, and the location of the magnetic material being automatically determined by a magnetic head.

10. An apparatus as recited in claim 1 wherein:
the storage medium is a Compact Disc; and
each group of data is a song.

11. An apparatus as recited in claim 1 wherein each group of data represents a picture.

12. An apparatus comprising:

a storage medium for storing a plurality of groups of data, each group being stored in a sector of the storage medium, and the groups being prioritized;

a plurality of switches located on the storage medium, each switch identifying a sector in the storage medium and each switch having a plurality of interchangeable positions to indicate the priority of its corresponding sector as compared to other sectors; and wherein each switch comprises:

a reflective material; and means for positioning the reflective material at a plurality of locations to determine the priority of its corresponding sector, and the location of the reflective material being automatically determined by the interaction of the reflective material with an incident electromagnetic radiation.

13. An apparatus as recited in claim 12 wherein:
the storage medium is a Compact Disc; and
each group of data is a song.

14. An apparatus as recited in claim 12 wherein each group of data is a picture.

15. An apparatus comprising:

a storage medium for storing a plurality of groups of data, each group being stored in a sector of the storage medium, and the groups being prioritized;

a plurality of switches located on the storage medium, each switch identifying a sector in the storage medium and each switch having a plurality of interchangeable positions to indicate the priority of its corresponding sector as compared to other sectors; and wherein each switch comprises:

an opaque material; and means for positioning the opaque material at a plurality of locations to determine the priority of its corresponding sector, the location of the opaque material being automatically determined by the interaction of the reflective material with an incident electromagnetic radiation.

16. An apparatus as recited in claim 15 wherein:
the storage medium is a Compact Disc; and
each group of data is a song.

17. An apparatus as recited in claim 15 wherein each group of data is a picture.

18. An apparatus comprising:

a storage medium for storing a plurality of groups of data, each group being stored in a sector of the storage medium, and the groups being prioritized;

a plurality of switches located on the storage medium, each switch identifying a sector in the storage medium and each switch having a plurality of interchangeable positions to indicate the priority of its corresponding sector as compared to other sectors: and wherein each switch comprises two interchangeable positions, one position indicating the corresponding sector being selected, the other position indicating the corresponding sector not being selected.

19. An apparatus as recited in claim 18 wherein each switch comprises a flexible reflective membrane with the two positions being a convex position and a concave position, and the position is automatically determined by the interaction of the flexible reflective membrane with an incident electromagnetic radiation.

20. An apparatus as recited in claim 18 wherein:
the storage medium is a Compact Disc; and
each group of data is song.

21. An apparatus as recited in claim 18 wherein each group of data is a picture.

22. An apparatus comprising:
a storage medium for storing a plurality of groups of data, each group being stored in a sector of the storage medium, and the groups being prioritized;
a plurality of switches located on the storage medium, each switch identifying a sector in the storage medium and each switch having a plurality of interchangeable positions to indicate the priority of its corresponding sector as compared to other sectors; and
wherein each switch comprises a plurality of sub-switches, with only one sub-switch being selected, the plurality of sub-switches being used to indicate the priority of the corresponding sector of the switch as compared to other sectors in the storage medium.

23. An apparatus as recited in claim 22 wherein:
the storage medium is a Compact Disc; and
each group of data is song.

24. An apparatus as recited in claim 22 wherein each group of data is a picture.

25. An apparatus as recited in claim 23 wherein each sub-switch comprises:
a reflective material; and
means for positioning the reflective material at a plurality of locations to determine the priority of its corresponding sector, and the location of the reflective material being automatically determined by the interaction of the reflective material with an incident electromagnetic radiation.

26. An apparatus as recited in claim 24 wherein each sub-switch comprises:
a reflective material;
means for positioning the reflective material at a plurality of locations to determine the priority of its corresponding sector, and the location of the reflective material being automatically determined by the interaction of the reflective material with an incident electromagnetic radiation.

27. An apparatus as recited in claim 23 wherein each sub-switch comprises:
an opaque material; and
means for positioning the opaque material at a plurality of locations to determine the priority of its corresponding sector, the location of the opaque material being automatically determined by the interaction of the reflective material with an incident electromagnetic radiation.

28. A method of indicating the priorities of a plurality of groups of data, with each group being stored in a sector in a storage medium using a plurality of switches located on the storage medium, each switch having a plurality of interchangeable positions, the methods comprising the steps of:
using a switch to identify a sector in the storage medium; and
using the plurality of interchangeable positions of each switch to indicate the priority of the group of data in the sector corresponding to that switch;
wherein, the positions of the switch being able to be changed by an operator, and the groups of data are recorded in the storage medium by a method different from a method to implement switching materials to the switches.

29. A method as recited in claim 28 further comprising the step of detecting automatically the position of the switch by electronic means to determine the priority of the group of data in the corresponding sector.

30. A method as recited in claim 29 further comprising the step of using a label adjacent to each switch to name the group of data in the corresponding sector.

* * * * *